UNITED STATES PATENT OFFICE.

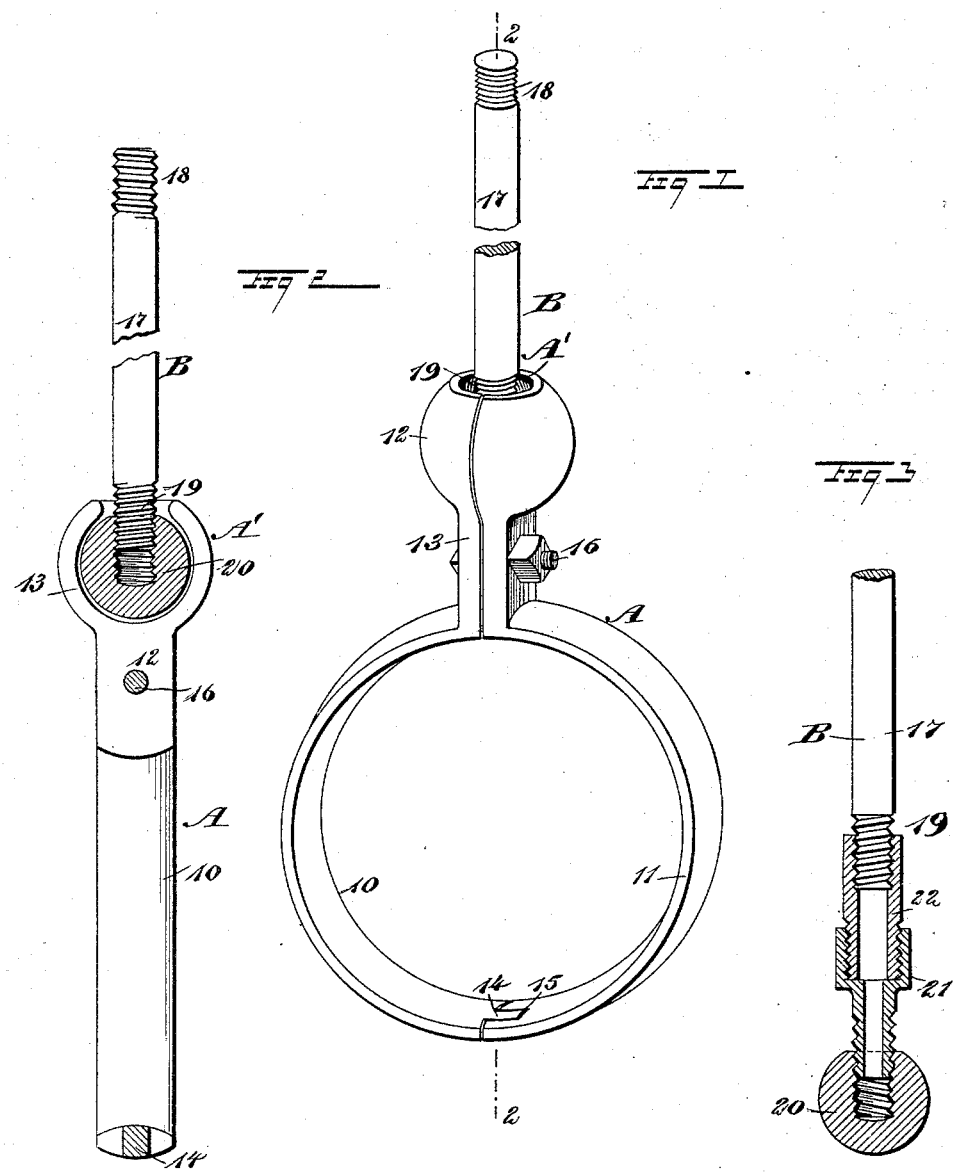

MANUEL J. HANNA, OF NEW YORK, ASSIGNOR TO WILLIAM H. QUICK, OF BROOKLYN, NEW YORK.

PIPE-HANGER.

SPECIFICATION forming part of Letters Patent No. 485,033, dated October 25, 1892.

Application filed November 24, 1891. Serial No. 412,973. (No model.)

*To all whom it may concern:*

Be it known that I, MANUEL J. HANNA, of New York city, in the county and State of New York, have invented a new and useful Improvement in Pipe-Hangers, of which the following is a full, clear, and exact description.

My invention relates to an improvement in pipe-hangers, and has for its object to provide a hanger which will admit of expansion in all directions and which will be simple, durable, and economic.

A further object of the invention is to so construct the hanger that by it the pipe may be inclined laterally in any desired direction and adjusted vertically in an expeditious and convenient manner.

Another object of the invention is to provide a means whereby the hanger may be attached to the pipe when the latter is in any position and whereby the lag-screw supporting the body of the hanger may be extended to any desired length.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a perspective view of the improved hanger. Fig. 2 is a section taken practically on the line 2 2 of Fig. 1, and Fig. 3 is a sectional view illustrating the manner in which the lag-screw may be extended as to length.

The hanger may be said to consist of two sections—a body-section A and a supporting-section B. The body-section is made in ring form and is divided, preferably, at the center into two sections 10 and 11. The upper end of each member has formed integral therewith an upwardly-extending shank 12, which shank is preferably made rectangular in cross-section and terminates at its upper end in a semicircular cup 13. Thus when the two members of the ring-body are brought together the shanks come in engagement one with the other and the semicircular cups likewise, forming thereby a circular socket A', as illustrated in Fig. 1, the semicircular cup of one of the members of the body being shown in Fig. 2. The members of the ring-body at their lower ends are united by a tongue-and-groove connection, the tongue 14 being formed integral with one member and the groove 15 being produced in the other. When the members of the body are placed together, the tongue enters the groove and a bolt 16 or equivalent fastening device is passed through the shanks below their socket-heads, as is likewise best shown in Fig. 1. This attachment is the only one employed, as the means for uniting the lower portions of the members is the tongue and groove above referred to.

The supporting-section of the hanger consists of a lag-screw 17. This lag-screw at its upper end is provided with a left-hand thread 18 and at its lower end with a right-hand thread 19, the lower end of the lag-screw being screwed into a ball 20, held to turn freely in the socket A', as is shown in Fig. 2. In the event that it should become necessary to lengthen the lag-screw this is accomplished by introducing a coupling 21 into the ball and screwing into the coupling and upon the lower thread of the lag-screw a supplementary section or pipe 22, as is shown in Fig. 3; or the extension of the lag-screw may be effected in any other equivalent manner.

It will be observed that this hanger is of peculiarly simple and durable construction, and that it effectually admits of the expansion and contraction of the pipe carried by it, and again, owing to the ball-and-socket connection between the body and the supporting members of the hanger, that the pipe may be inclined laterally in any desired direction. Further, that after the pipe has been placed in the body of the hanger and the lag-screw introduced into a beam or other overhead support the pipe may be raised or lowered to give a desired vertical inclination by turning the lag-screw so that more or less of it will enter the beam or overhead support. This is readily accomplished owing to the threads upon the screw and the fact that the ball which effects the connection between the lag-screw and the body of the hanger is free to turn in the socket of the latter. It is also obvious that the hanger may be applied to a pipe already in position, since its body portion, which is adapted to encircle the pipe, is made in two sections, said sections being capable of a convenient and expeditious application.

Having thus described my invention, I claim as new and desire to secure by Letters Patent—

1. A pipe-hanger comprising the ring A, formed in two parts 10 11, having apertured shanks lying face to face and each terminating in a cup, forming the socket A', the shanks being bolted together through their apertures, and the ball within the socket and having an attaching device, substantially as set forth.

2. The combination, with the attaching-screw 17, having an adjustable ball on its lower end, of the ring A in two sections 10 11, each having a shank, the shanks lying face to face and terminating in a cup, forming a socket A', inclosing the ball, and a bolt passing through the said shanks and securing the two ring-sections together, substantially as set forth.

MANUEL J. HANNA.

Witnesses:
 THOMAS MCKEACHEL, Jr.,
 JOSEPH CONNOLLY.